United States Patent
Yang et al.

(10) Patent No.: US 10,869,288 B2
(45) Date of Patent: Dec. 15, 2020

(54) METHOD FOR DETERMINING TRANSMISSION TIMING IN V2X UE

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/090,151

(22) PCT Filed: Mar. 20, 2017

(86) PCT No.: PCT/KR2017/002933
§ 371 (c)(1),
(2) Date: Sep. 28, 2018

(87) PCT Pub. No.: WO2017/171284
PCT Pub. Date: Oct. 5, 2017

(65) Prior Publication Data
US 2019/0116571 A1      Apr. 18, 2019

Related U.S. Application Data

(60) Provisional application No. 62/315,023, filed on Mar. 30, 2016, provisional application No. 62/416,171, filed on Nov. 2, 2016.

(51) Int. Cl.
*H04W 56/00* (2009.01)
*G01S 19/25* (2010.01)

(52) U.S. Cl.
CPC ....... *H04W 56/0045* (2013.01); *G01S 19/256* (2013.01); *H04W 56/0015* (2013.01); *H04W 56/0035* (2013.01)

(58) Field of Classification Search
None
See application file for complete search history.

(56) References Cited

U.S. PATENT DOCUMENTS

| 10,721,697 B2 * | 7/2020 | Li | ..................... H04W 56/0015 |
| 2017/0230996 A1 * | 8/2017 | Li | ..................... H04W 72/1284 |

(Continued)

FOREIGN PATENT DOCUMENTS

EP         2048797         4/2009

OTHER PUBLICATIONS

Qualcomm Inc., "Synchronization Procedure for V2V", Feb. 15-19, 2016, 3GPP TSG-RAN WG1 #84, pp. 1-5 (Year: 2016).*

(Continued)

*Primary Examiner* — Steve R Young
(74) *Attorney, Agent, or Firm* — Lee, Hong, Degerman, Kang & Waimey PC

(57) ABSTRACT

There is provided a method for determining transmission timing. The method may be performed by a terminal and comprise: receiving information on a first timing offset between a signal of a base station and a signal of a satellite and information on a reference cell; performing a time synchronization based on the signal of the satellite; and determining transmission timing based on the first timing offset and a second timing offset for the reference cell.

10 Claims, 17 Drawing Sheets

(56) References Cited

U.S. PATENT DOCUMENTS

| | | | |
|---|---|---|---|
| 2018/0049235 A1* | 2/2018 | Baghel | H04W 76/14 |
| 2018/0234928 A1* | 8/2018 | Yasukawa | H04W 4/70 |
| 2018/0359749 A1* | 12/2018 | Liu | H04W 4/70 |
| 2019/0289561 A1* | 9/2019 | Corley | H04B 1/70735 |
| 2020/0084738 A1* | 3/2020 | Nguyen | H04W 76/14 |
| 2020/0100306 A1* | 3/2020 | Ayaz | H04W 8/005 |

OTHER PUBLICATIONS

Huawei, HiSilicon, "Synchronization procedure and synchronization source priority for V2V", Feb. 15-19, 2016, 3GPP TSG RAN WG1 Meeting #84, pp. 1-6 (Year: 2016).*

PCT International Application No. PCT/KR2017/002933, International Search Report dated May 23, 2017, 4 pages.

Huawei, "Synchronization procedure and synchronization source priority for V2V," 3GPP TSG-RAN WG1 #84, R1-160306, Feb. 2016, 8 pages.

NEC, "Synchronisation in V2X ," 3GPP TSG-RAN WG1 #84, R1-160395, Feb. 2016, 5 pages.

LG Electronics, "Discussion on sidelink synchronization for PC5-based V2V," 3GPP TSG-RAN WG1 #84, R1-160639, Feb. 2016, 6 pages.

Qualcomm Incorporated, "Synchronization Procedure for V2V," 3GPP TSG-RAN WG1 #84, R1-160898, Feb. 2016, 7 pages.

* cited by examiner

METHOD FOR DETERMINING TRANSMISSION TIMING IN V2X UE

CROSS-REFERENCE TO RELATED APPLICATIONS

This application is the National Stage filing under 35 U.S.C. 371 of International Application No. PCT/KR2017/002933, filed on Mar. 20, 2017, which claims the benefit of U.S. Provisional Application No. 62/315,023, filed on Mar. 30, 2016, and 62/416,171, filed on Nov. 2, 2016, the contents of which are all hereby incorporated by reference herein in their entireties.

BACKGROUND OF THE INVENTION

Field of the Invention

The present invention relates to mobile communication.

Discussion of the Related Art $3^{rd}$ generation partnership project (3GPP) long term evolution (LTE) evolved from the universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

In LTE/LTE-A, physical channels for LTE may be classified into downlink channels, that is, a physical downlink shared channel (PDSCH) and a physical downlink control channel (PDCCH), and uplink channels, that is, a physical uplink shared channel (PUSCH) and a physical uplink control channel (PUCCH).

There is a need for communication between pieces of UE located at a physically close distance, that is, device to device (D2D) communication, due to an increase of user needs for social network service (SNS).

D2D communication may be performed between pieces of UE located in coverage of a base station or may be performed between pieces of UE located out of coverage of the base station. Furthermore, D2D communication may be performed between UE located out of coverage of a base station and UE located in coverage of the base station.

Contents regarding D2D may be applied to vehicle-to-everything (V2X). V2X generally refers to a communication technology through a vehicle and all of interfaces. An implementation form of V2X may be various, such as vehicle-to-vehicle (V2V), vehicle-to-infrastructure (V2I), vehicle-to-person (V2P), and vehicle-to-network (V2N).

From among various implementation examples of V2X, an implementation example of V2V communication is described. There is a good possibility that a vehicle may be located in a shadow area in coverage of a base station or may be located out of coverage of a base station. However, there is a problem in that the existing 3GPP standard is not suitable for an implementation example of V2V communication because D2D UE is synchronized with time sync based on a sync signal (i.e., the time of a downlink subframe) from a base station in the existing 3GPP standard.

According to the disclosure of the present invention, the problem of the conventional technology described above may be solved.

SUMMARY OF THE INVENTION

Accordingly, an object of the present invention is to solve the above-mentioned problems.

To achieve the foregoing object, a disclosure of the present invention proposes a method for determining transmission timing. The method may be performed by a vehicle to vehicle (V2V) terminal and comprise: receiving information on a first timing offset to a timing derived from a signal of a satellite and information on a reference cell, wherein the first timing offset is determined by a base station; performing a time synchronization based on the signal of the satellite; and determining transmission timing based on the first timing offset and a second timing offset for the reference cell.

The first timing offset may include a direct frame number (DFN) offset for adjusting the time synchronization performed based on the signal of the satellite.

The information on the reference signal may be received if time synchronization is performed based on the signal of the satellite.

The time synchronization may be performed based on the signal of the satellite if the terminal is located in coverage of the base station or out of coverage of the base station.

The satellite may be a global navigation satellite system (GNSS).

The transmission timing may be determined by $(N_{TA,SL} + N_{TA\ offset} + N_{GNSSoffset}) \cdot T_s$. In this case, $N_{TA,SL}$ indicates a timing offset applied for a sidelink for communicating with a neighboring terminal, $N_{GNSSoffset}$ indicates the first timing offset, $N_{TA\ offset}$ corresponds to the second timing offset and indicates a timing advance offset, and $T_s$ indicates a basic time unit.

The method may further comprise transmitting a signal to a neighboring terminal on the determined transmission timing.

To achieve the foregoing object, a disclosure of the present invention also proposes a vehicle to vehicle (V2V) terminal for determining transmission timing. The V2V terminal may comprise: a transceiver; and a processor operatively connected to the transceiver and configured to: receive information on a first timing offset to a timing derived from a signal of a satellite and information on a reference cell, wherein the first timing offset is determined by a base station, perform a time synchronization based on the signal of the satellite, and determine transmission timing based on the first timing offset and a second timing offset for the reference cell.

DETAILED DESCRIPTION OF THE EMBODIMENTS

Figure 1:
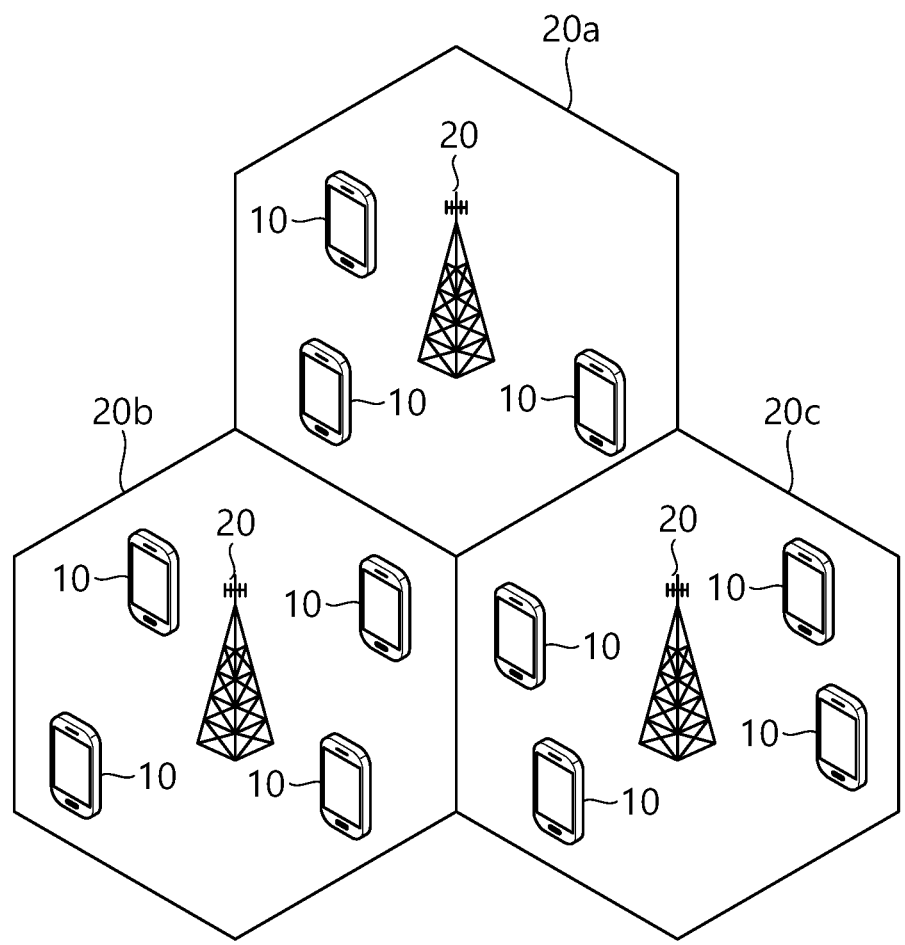
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Furthermore, the technical terms used herein should be, unless defined otherwise, interpreted as having meanings generally understood by those skilled in the art but not too broadly or too narrowly. Furthermore, the technical terms used herein, which are determined not to exactly represent the spirit of the invention, should be replaced by or understood by such technical terms as being able to be exactly understood by those skilled in the art. Furthermore, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term "include" or "have" may represent the presence of a feature, a number, a step, an operation, a element, a part or a combination thereof described in the present invention, and may not exclude the presence or addition of another feature, another number, another step, another operation, another element, another part or the combination thereof.

The terms "first" and "second" are used for the purpose of explanation about various elements, and the elements are not limited to the terms "first" and "second". The terms "first" and "second" are only used to distinguish one element from another element. For example, a first element may be named as a second element without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same elements throughout the drawings, and repetitive description on the same elements will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, a "base station" commonly refers to a fixed station that communicates with a wireless device and may be denoted as another term, such as an evolved-NodeB (eNB), a base transceiver system (BTS) or an access point.

As used herein, "user equipment (UE)" may be stationary or mobile, and may be denoted as another term, such as a device, a wireless device, a terminal, a mobile station (MS), a user terminal (UT), a subscriber station (SS), or a mobile terminal (MT).

FIG. 1 illustrates a wireless communication system.

As seen with reference to FIG. 1, the wireless communication system includes at least one base station (BS) 20. Each base station 20 provides a communication service to specific geographical areas (commonly referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
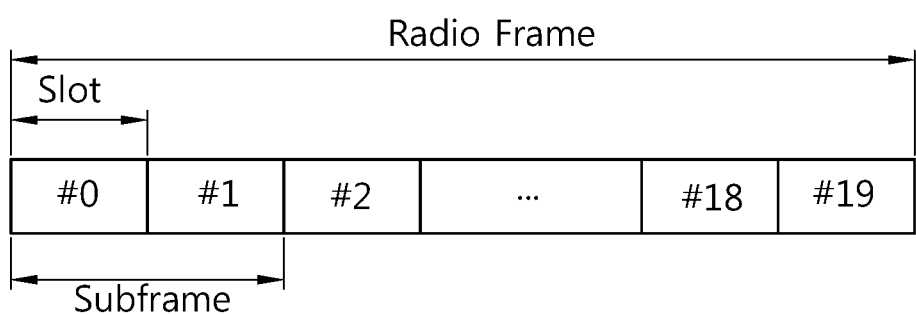
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame includes 10 subframes indexed 0 to 9. One subframe includes two consecutive slots. Accordingly, the radio frame includes 20 slots. The time taken for one subframe to be transmitted is called a transmission time interval (TTI). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
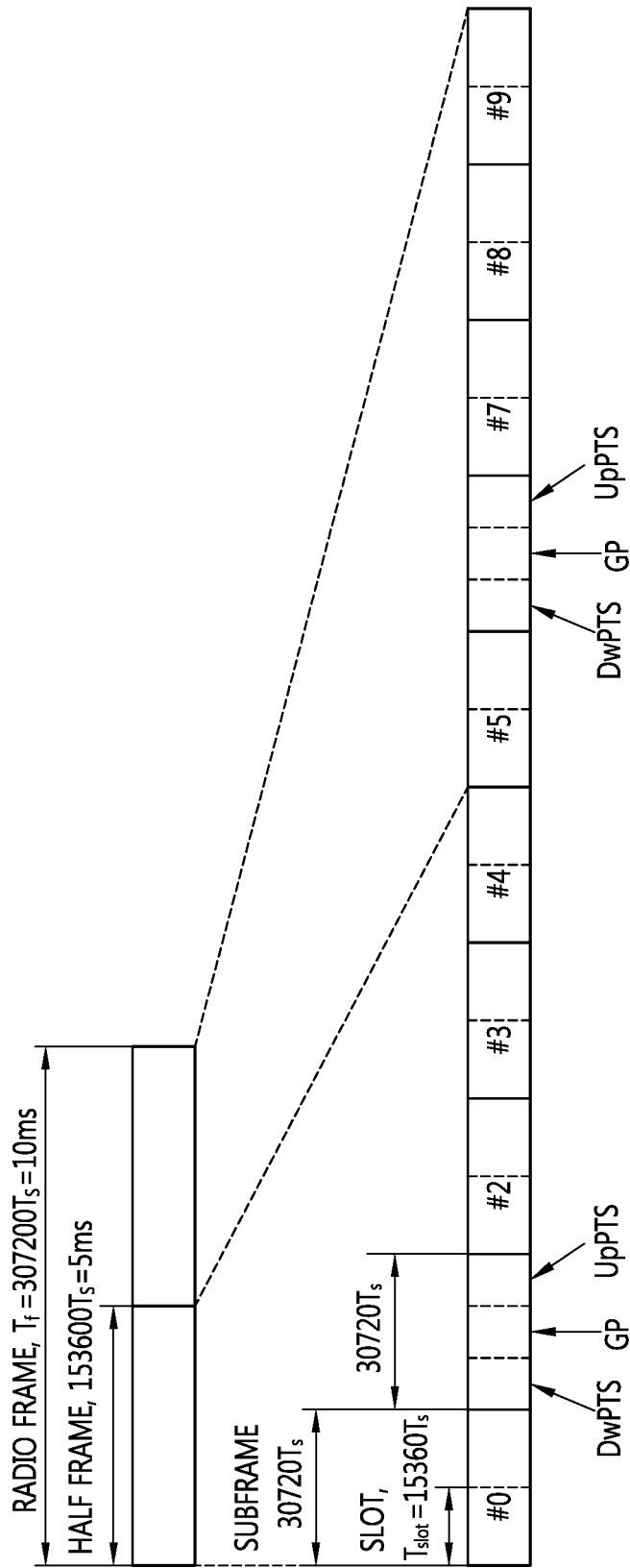
FIG. 3 illustrates a structure of a downlink radio frame according to TDD in the 3GPP LTE.

FIG. 3 illustrates the architecture of a downlink radio frame according to TDD in 3GPP LTE.

Sub-frames having index #1 and index #6 are denoted special subframes, and include a downlink pilot time slot (DwPTS), a guard period (GP) and an uplink pilot time slot (UpPTS). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a downlink (DL) subframe and an uplink (UL) subframe coexist in one radio frame. Table 1 shows an example of the configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In TDD, a DL (downlink) subframe and a UL (Uplink) co-exist in one radio frame. Table 1 shows an example of configuration of a radio frame.

"D" denotes a DL subframe, "U" is a UL subframe, and "S" is a special subframe. When receiving a UL-DL configuration from a base station, a terminal may be aware whether a subframe is a DL subframe or a UL subframe based on the configuration of a radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Figure 4:
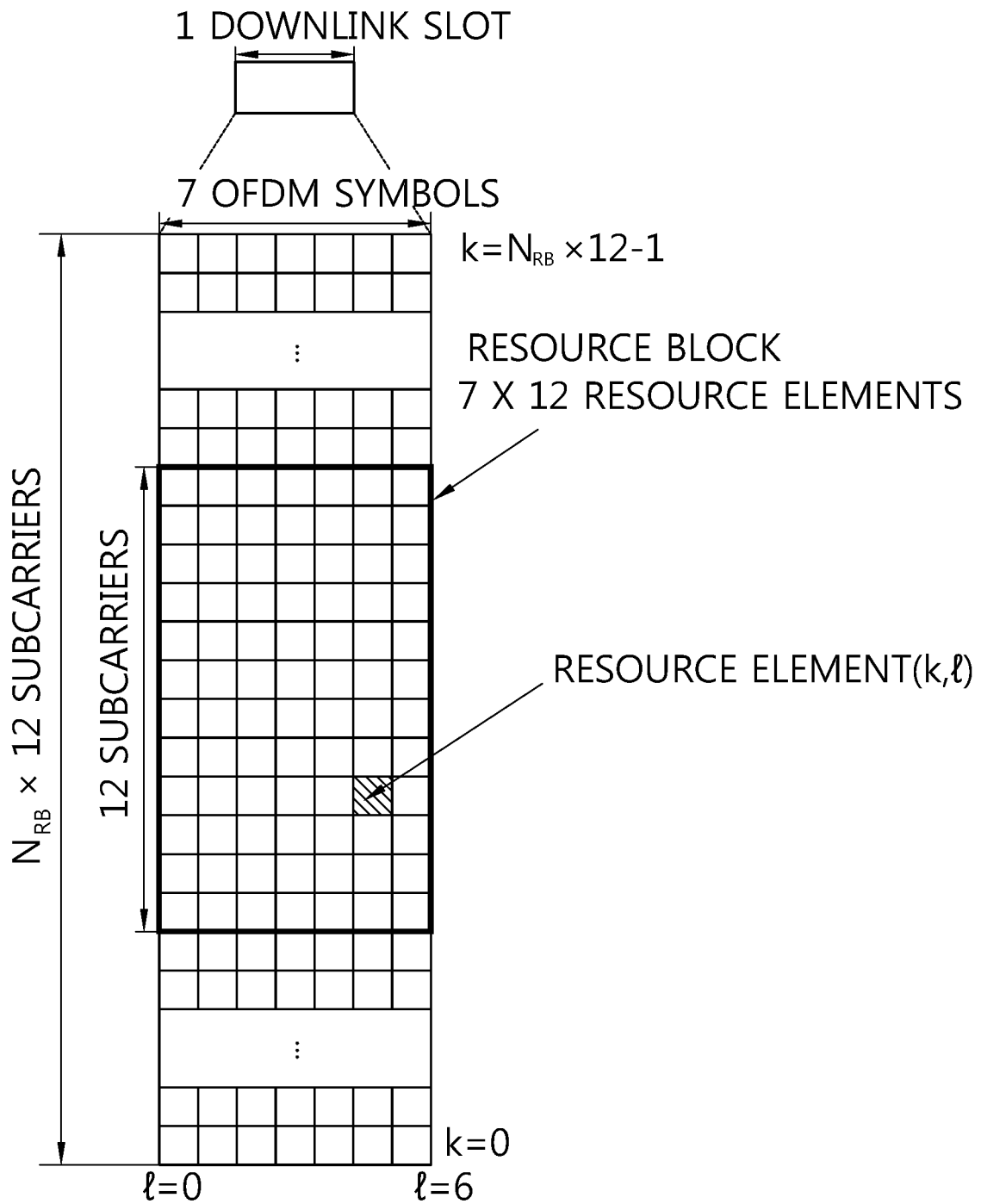
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of orthogonal frequency division multiplexing (OFDM) symbols in the time domain and N resource blocks (NRBs) in the frequency domain. For example, in the LTE system, the number of resource blocks (RBs), i.e., NRBs, may be one of 6 to 110.

The RB is a unit of resource allocation and includes a plurality of sub-carriers in the frequency domain. For example, if one slot includes seven OFDM symbols in the time domain and the RB includes 12 sub-carriers in the frequency domain, one RB may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
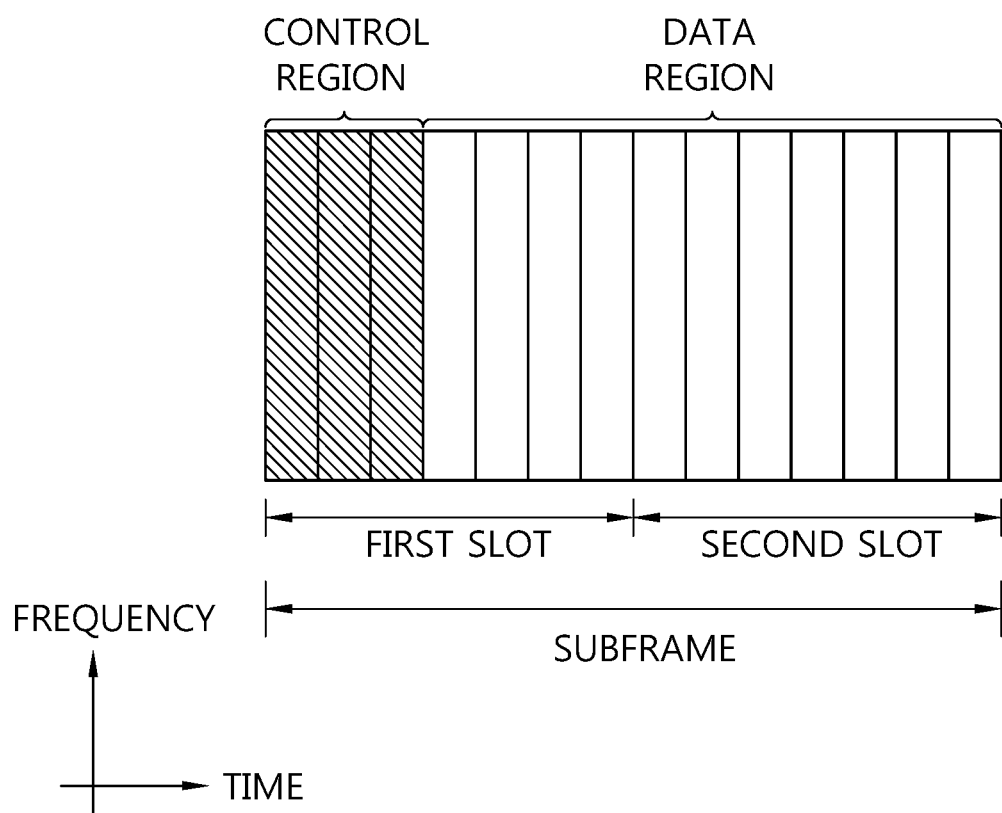
FIG. 5 illustrates a structure of a downlink subframe.

FIG. 5 illustrates the architecture of a downlink subframe.

In FIG. 5, assuming the normal CP, one slot includes seven OFDM symbols, by way of example.

The DL subframe is split into a control region and a data region in the time domain. The control region includes up to first three OFDM symbols in the first slot of the subframe. However, the number of OFDM symbols included in the control region may be changed. A physical downlink control channel (PDCCH) and other control channels are assigned to the control region, and a PDSCH is assigned to the data region.

In 3GPP LTE, physical channels may be classified into data channels, such as a physical downlink shared channel (PDSCH) and a physical uplink shared channel (PUSCH), and control channels, such as a physical downlink control channel (PDCCH), a physical control format indicator channel (PCFICH), a physical hybrid-ARQ indicator channel (PHICH), and a physical uplink control channel (PUCCH).

Figure 6:
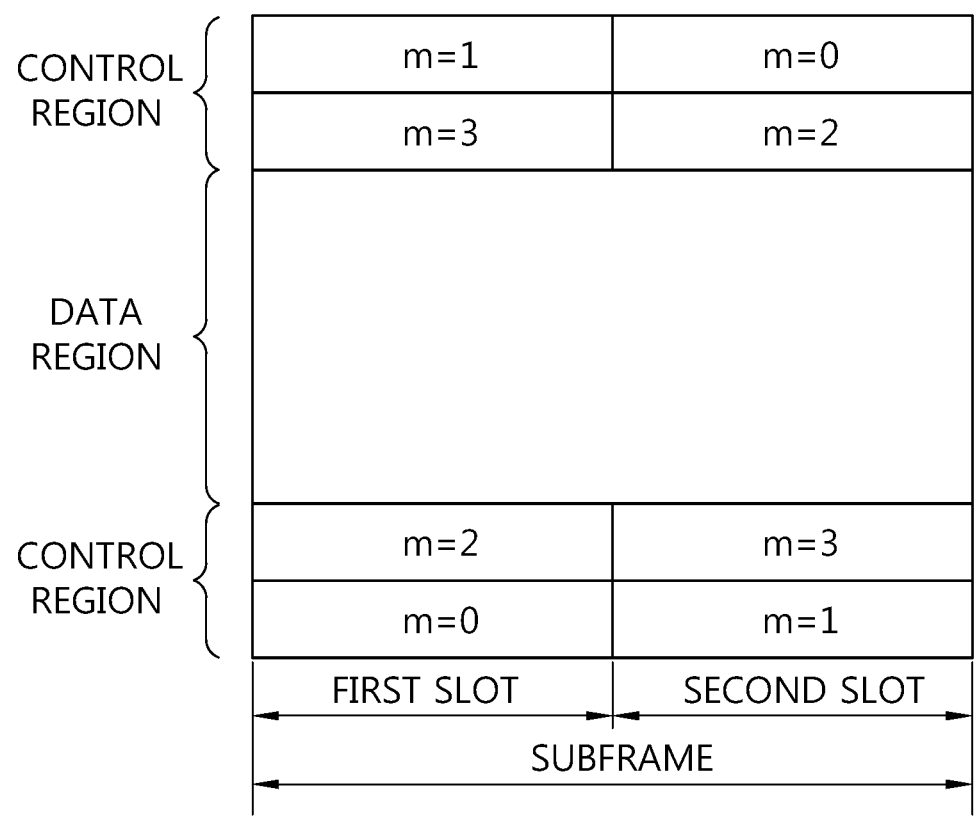
FIG. 6 illustrates the architecture of an uplink subframe in 3GPP LTE.

FIG. 6 illustrates the architecture of an uplink subframe in 3GPP LTE.

Referring to FIG. 6, the uplink subframe may be separated into a control region and a data region in the frequency domain. The control region is assigned a PUCCH for transmission of uplink control information. The data region is assigned a PUSCH for transmission of data (in some cases, control information may also be transmitted).

The PUCCH for one terminal is assigned in a resource block (RB) pair in the subframe. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the subframe.

The uplink control information transmitted on the PUCCH includes a hybrid automatic repeat request (HARQ), acknowledgement (ACK)/non-acknowledgement (NACK), a channel quality indicator (CQI) indicating a downlink channel state, and a scheduling request (SR) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Alternatively, the uplink data may be multiplexed data. The multiplexed data may be data obtained by multiplexing the transport block for the UL-SCH and control information. For example, the control information multiplexed with the data may include a CQI, a precoding matrix indicator (PMI), an HARQ, and a rank indicator (RI). Alternatively, the uplink data may include only of control information.

<Carrier Aggregation (CA)>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Furthermore, in carrier aggregation, cells may be divided into a primary cell, a secondary cell, and a serving cell. A primary cell denotes a cell operating at a primary frequency, in which UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

<Device to Device (D2D) Communication>

D2D communication which is expected to be introduced into a next-generation communication system is described below.

Figure 7:
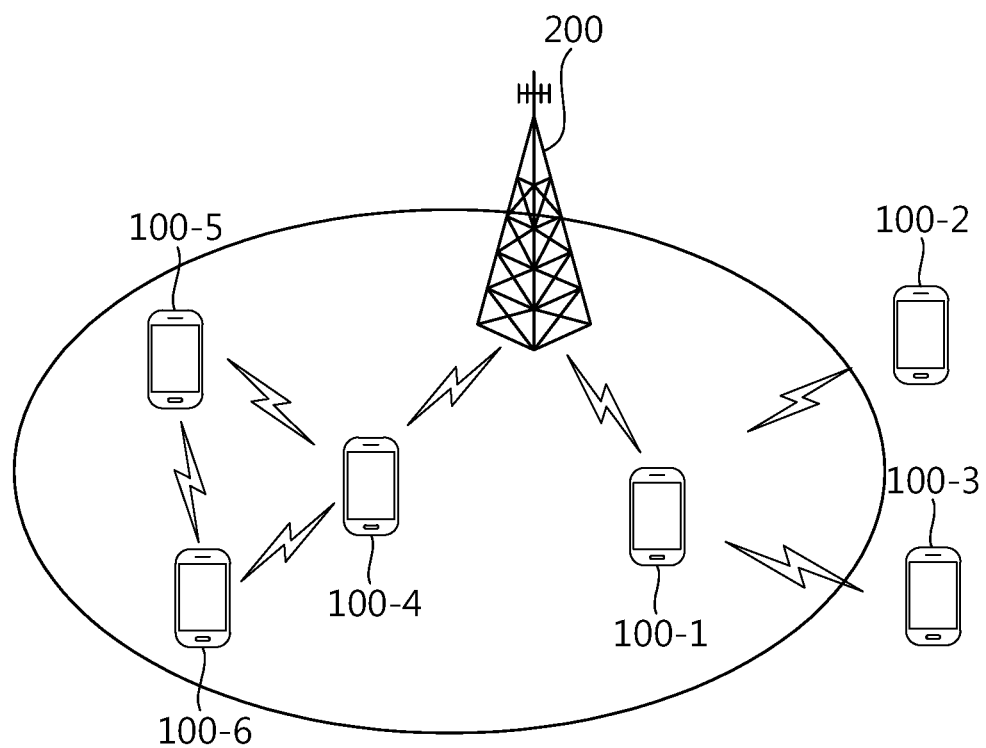
FIG. 7 shows the concept of device to device (D2D) communication which is expected to be introduced into a next-generation communication system.

FIG. 7 shows the concept of device to device (D2D) communication which is expected to be introduced into a next-generation communication system.

There is a need for communication between pieces of UE located at a physically close distance, that is, device to device (D2D) communication, due to an increase of user needs for social network service (SNS).

Figure 8:
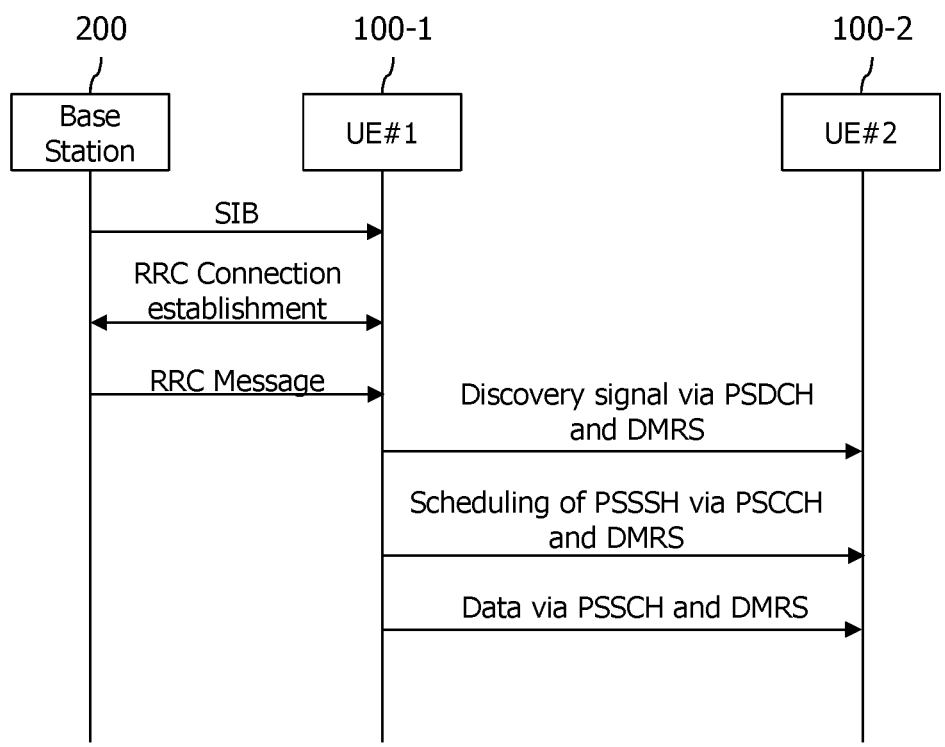
FIG. 8 shows an example of D2D communication or ProSe communication between UE #1 and UE #2 shown in FIG. 7.

In order to reflect the aforementioned needs, as shown in FIG. 8, a scheme for direct communication between UE #1 100-1, UE #2 100-2, and UE #3 100-3 or between UE #4 100-4, UE #5 100-5, and UE #6 100-6 without the intervention of an eNodeB (eNB) 200 is being discussed. The UE #1 100-1 and the UE #4 100-4 may directly communicate with each other with the help of the base station 200. The UE #4 100-4 may play the role of a relay node for the UE #5 100-5 and the UE #6 100-6. Likewise, the UE #1 100-1 may play the role of a relay node for the UE #2 100-2 and the UE #3 100-3 which are located far from the center of a cell.

D2D communication is also called a proximity service (ProSe). Furthermore, UE that performs a ProSe is also called ProSe UE. Furthermore, a link between pieces of UE used for the D2D communication is also called a sidelink. A frequency band which may be used in the sidelink is as follows.

TABLE 3

| Sidelink band | E-UTRA band | Transmission $F_{UL\_low}$-$F_{UL\_high}$ | Reception $F_{DL\_low}$-$F_{DL\_high}$ | Duplex mode |
|---|---|---|---|---|
| 2 | 2 | 1850 MHz-1910 MHz | 1850 MHz-1910 MHz | HD |
| 3 | 3 | 1710 MHz-1785 MHz | 1710 MHz-1785 MHz | HD |

TABLE 3-continued

| Sidelink band | E-UTRA band | Transmission $F_{UL\_low}$-$F_{UL\_high}$ | Reception $F_{DL\_low}$-$F_{DL\_high}$ | Duplex mode |
|---|---|---|---|---|
| 4 | 4 | 1710 MHz-1755 MHz | 1710 MHz-1755 MHz | HD |
| 7 | 7 | 2500 MHz-2570 MHz | 2500 MHz-2570 MHz | HD |
| 14 | 14 | 788 MHz-798 MHz | 788 MHz-798 MHz | HD |
| 20 | 20 | 832 MHz-862 MHz | 832 MHz-862 MHz | HD |
| 26 | 26 | 814 MHz-849 MHz | 814 MHz-849 MHz | HD |
| 28 | 28 | 703 MHz-748 MHz | 703 MHz-748 MHz | HD |
| 31 | 31 | 452.5 MHz-457.5 MHz | 452.5MHz-457.5 MHz | HD |
| 41 | 41 | 2496 MHz-2690 MHz | 2496 MHz-2690 MHz | HD |

Physical channels used in the sidelink are as follows.

A physical sidelink shared channel (PSSCH)

A physical sidelink control channel (PSCCH)

A physical sidelink discovery channel (PSDCH)

A physical sidelink broadcast channel (PSBCH)

Furthermore, physical signals used in the sidelink are as follows.

A demodulation reference signal (DMRS)

A sidelink sync signal (SLSS)

The SLSS includes a primary sidelink sync signal (PSLSS) and a secondary sidelink sync signal (SSLSS).

FIG. 8 shows an example of D2D communication or ProSe communication between UE #1 and UE #2 shown in FIG. 7.

Referring to FIG. 8, the base station 200 broadcasts a system information block (SIB) to the cell.

The SIB may include information about a resource pool related to D2D communication. The information about a resource pool related to D2D communication may be divided into an SIB type 18 and an SIB type 19.

The SIB type 18 may include resource configuration information for D2D communication. Furthermore, the SIB type 19 may include resource configuration information for D2D discovery.

The SIB type 19 includes discSyncConfig as follows.

TABLE 4

| | SIB type 19 |
|---|---|
| discSyncConfig | Indicates a configuration regarding whether UE is permitted to receive or transmit sync information. A base station (E-UTRAN) may configure discSyncConfig when UE attempts to send sync information using dedicated signaling. |

The discSyncConfig includes SL-SyncConfig. The SL-SyncConfig includes configuration information for the reception of an SLCC and the transmission of an SLSS as in the following table.

TABLE 5

| | Description of an SL-SyncConfig field |
|---|---|
| discSyncWindow | It is also called a searching window. It indicates a sync window that UE expects an SLSS. The value may be set to w1 or w2. The value w1 indicates 5 milliseconds, and the value w2 corresponds to a length obtained by dividing a normal CP by 2. |
| syncTxPeriodic | It indicates whether UE sends an SLSS once or periodically (e.g., every 40 ms) within each period of a discovery signal transmitted by the UE. In the case of periodical transmission, UE also sends MasterInformationBlock-SL. |

TABLE 5-continued

| | Description of an SL-SyncConfig field |
|---|---|
| syncTxThreshIC | It indicates a threshold value used in coverage. If an RSRP value measured with respect to counterpart UE (recognized like a cell) selected for sidelink communication is lower than the threshold value, UE may send an SLCC for sidelink communication with the counterpart UE. |
| txParameters | It includes the parameter of a configuration for transmission. |

The UE #1 100-1 located in coverage of the base station 200 establishes RRC connection with the base station 200.

Furthermore, the UE #1 100-1 receives an RRC message, for example, an RRC Connection Reconfiguration message from the base station 200. The RRC message includes a discovery configuration (hereinafter referred to as "discConfig"). The discConfig includes configuration information about a discover resource pool (hereinafter referred to as "DiscResourcePool"). The DiscResourcePool includes information listed in the following table.

TABLE 6

| | DiscResourcePool |
|---|---|
| discPeriod | It may also be indicated as a discovery period and may also be called a PSDCH period, that is, the period of a resource allocated within a cell for the transmission/reception of a discovery message. The value may be rf32, rf64, rf128, rf256, rf512, or rf1024. Such a value indicates the number of radio frames. That is, when the value is rf32, it indicates 32 radio frames. |
| numRepetition | It indicates a number value that subframeBitmap to be mapped to a subframe generated within the discPeriod is repeated. A base station configures the numRepetition and the subframeBitmap so that the mapped subframe does not exceed the discPeriod. |
| TF-ResourceConfig | It designates a set of time/frequency resources used for sidelink communication. |

The TF-ResourceConfig includes information listed in the following table.

TABLE 7

| SL-TF-ResourceConfig-r12 ::= | SEQUENCE { |
|---|---|
| prb-Num-r12 | INTEGER (1..100), |
| prb-Start-r12 | INTEGER (0..99), |
| prb-End-r12 | INTEGER (0..99), |
| offsetIndicator-r12 | SL-OffsetIndicator-r12, |
| subframeBitmap-r12 | SubframeBitmapSL-r12 |
| } | |

The SubframeBitmapSL is the same listed in the following table.

TABLE 8

| | |
|---|---|
| SubframeBitmapSL | It may also be indicated as discoverySubframeBitmap and designates a subframe bitmap indicative of a resource used in a sidelink. The value may be designated as bs4, bs8, bs12, bs16, bs30, bs40 or bs40. For example, the value bs40 means a bit string length of 40. |

The SL-OffsetIndicator includes information listed in the following table.

TABLE 9

| | |
|---|---|
| SL-OffsetIndicator | It may also be indicated as discoveryOffsetIndicator and indicates an offset of the first period of a resource pool within an SFN cycle. |
| SL-OffsetIndicatorSync | It may also be indicated as SyncOffsetIndicator and indicates a relation between SFNs and a subframe included in a sync resource according to an equation. (SFN*10+ Subframe Number) mod 40 = SL-OffsetIndicatorSync. |

In order for the UE #1 100-1 to discover suitable UE nearby for D2D communication or ProSe communication or in order for the UE #1 100-1 to provide notification of its presence, it may send a discovery signal through a PSDCH.

Furthermore, the UE #1 100-1 may send scheduling assignment (SA) through a PSCCH. Furthermore, the UE #1 100-1 may send a PSSCH including data based on the scheduling assignment (SA).

Figure 9:
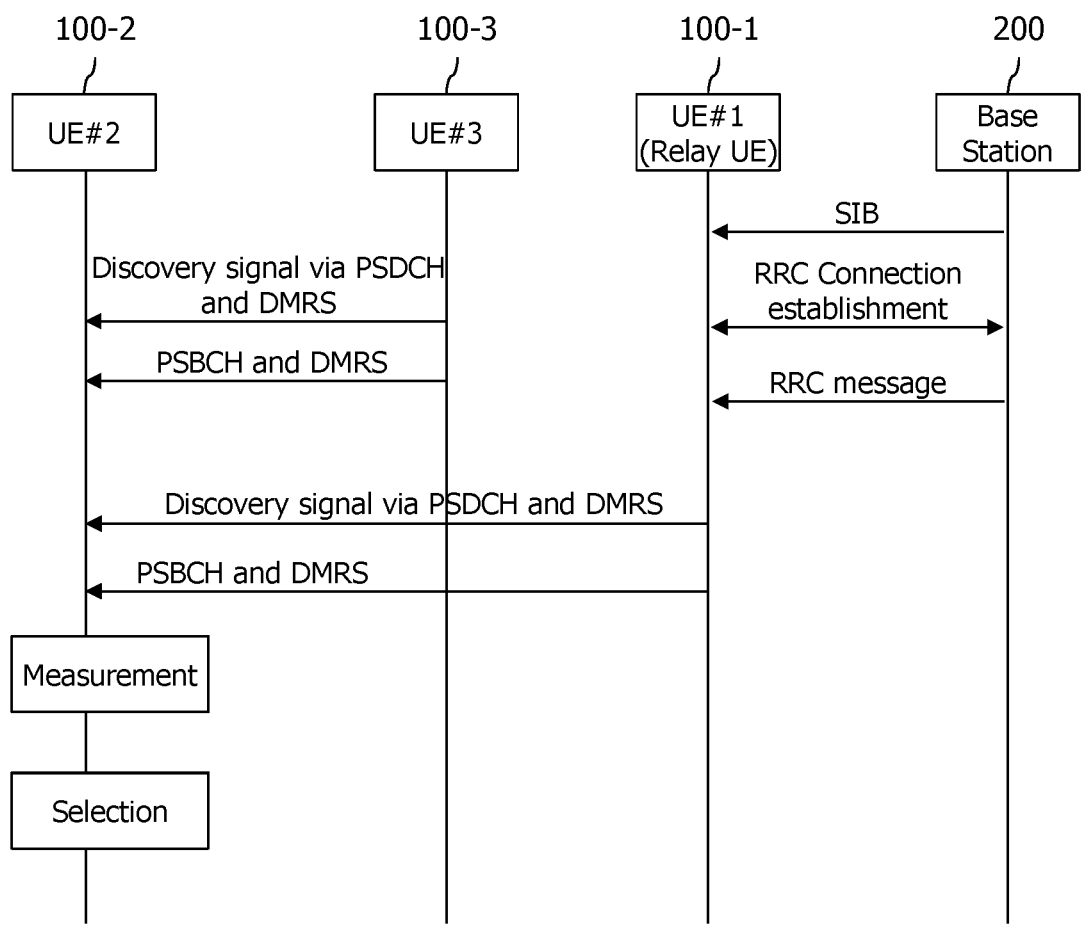
FIG. 9 shows an example in which the UE #2 selects relay UE in FIG. 7.

FIG. 9 shows an example in which the UE #2 selects relay UE in FIG. 7.

Referring to FIG. 9 along with FIG. 7, the UE #2 100-2 located out of coverage of the base station receives a discovery signal and a DMRS for the demodulation of the discovery signal from adjacent pieces of UE in order to perform D2D communication with the UE #1 100-1 which is located in coverage of the base station and may operate as relay UE. Furthermore, the UE #2 100-2 receives a PSBCH and a DMRS for the demodulation of the PSBCH from adjacent pieces of UE.

Accordingly, the UE #2 100-2 performs measurement based on the received signals.

The measurement includes the measurement of sidelink reference signal received power (S-RSRP) and the measurement of sidelink discovery reference signal received power (SD-RSRP).

In this case, the S-RSRP means average received power on a resource element (RE) including the DMRS for the demodulation of the PSBCH received within 6 PBBs in the middle. In this case, power per RE is determined based on energy received on a portion other than the CP portion of an OFDM symbol.

The SD-RSRP means average received power on an RE including a DMRS for the demodulation of a PSDCH if a CRC check is successful depending on the successful decoding of the PSDCH including the discovery signal.

When the measurement is completed, the UE #2 100-2 selects the UE #1 100-1 which may operate as relay UE based on a result of the measurement, that is, a result of the measurement of the SD-RSRP.

<Vehicle-to everything (V2X)>

The contents regarding D2D may also be applied to vehicle-to-everything (V2X). V2X collectively refers to a communication technology through a vehicle and all of interfaces. An implementation form of V2X may be as follows.

First, in V2X, "X" may be a vehicle. In this case, V2X may be indicated as vehicle-to-vehicle (V2V) and may mean communication between vehicles.

Figure 10:
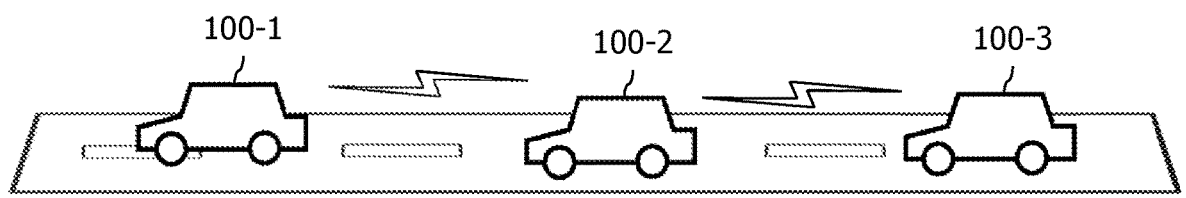
FIG. 10 is an exemplary diagram showing the concept of V2X.

FIG. 10 is an exemplary diagram showing the concept of V2X.

As may be seen with reference to FIG. 10, vehicles (i.e., radio devices 100-1, 100-2, and 100-3 mounted on the vehicles) may perform mutual communication.

In V2X, "X" may mean a person or a pedestrian. In this case, V2X may be indicated as a vehicle-to-person or vehicle-to-pedestrian (V2P). In this case, the pedestrian is not necessarily limited to a person who walks, but may include a person who rides a bicycle and a driver or passenger on a (specific speed or less) vehicle.

Alternatively, "X" may mean an infrastructure/network. In this case, V2X may be indicated as vehicle-to-infrastructure (V2I) or a vehicle-to-network (V2N), and may mean communication between a vehicle and a roadside unit (RSU) or between a vehicle and a network. The RSU may be traffic-related infrastructure, for example, a device that provides notification of speed. The RSU may be implemented in a base station or fixed UE.

From among various implementation examples of V2X, an implementation example of V2V communication is described below. There is a good possibility that a vehicle may be located in a shadow area in coverage of a base station or may be located out of the coverage of the base station.

However, there is a problem in that the existing 3GPP standard is not suitable for an implementation example of V2V communication because D2D UE is synchronized with time sync based on a sync signal (i.e., the time of a downlink subframe) from a base station in the existing 3GPP standard. In order to solve the problem, a signal from a satellite may be used as a sync signal for V2V communication. This is described with reference to FIG. 11.

Figure 11:
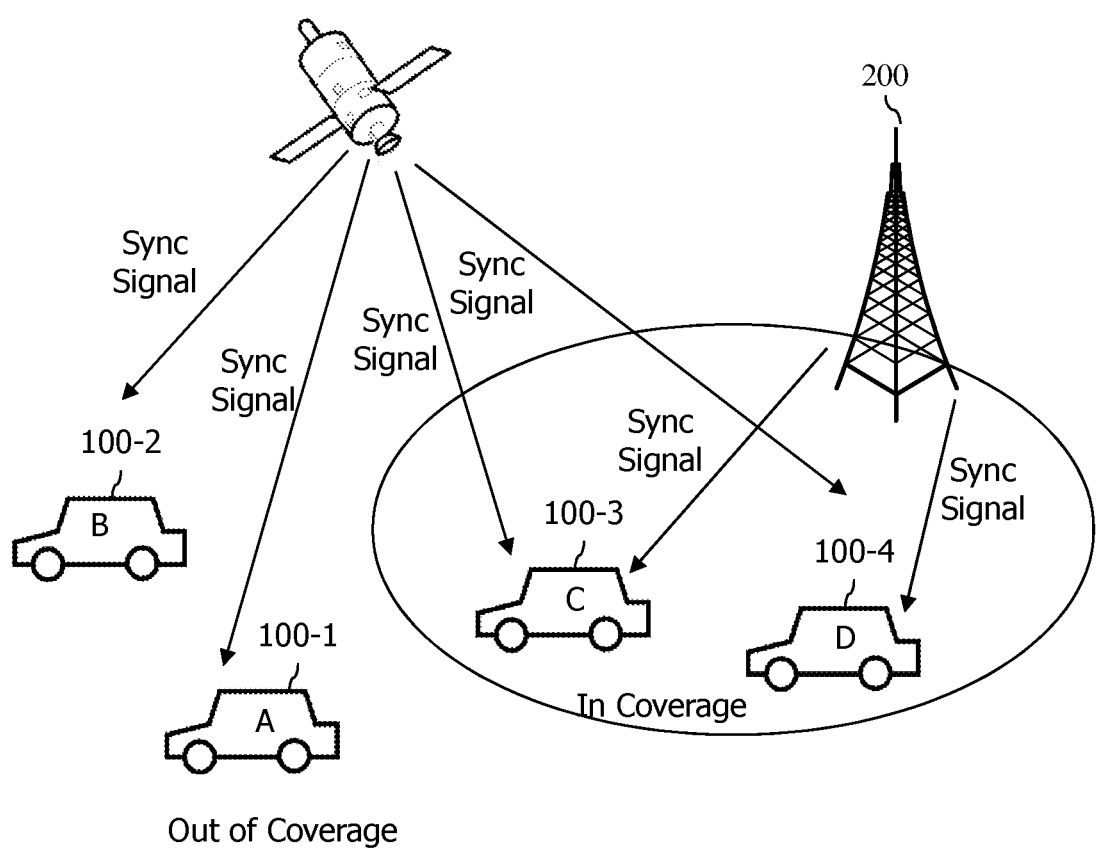
FIG. 11 is an exemplary diagram showing an example in which a signal from a satellite is used as a sync signal for V2X communication.

FIG. 11 is an exemplary diagram showing an example in which a signal from a satellite is used as a sync signal for V2X communication.

Referring to FIG. 11, V2X UE C 100-3 and V2X UE D 100-4 are present in coverage (IC) of a base station 200, and V2X UE A 100-1 and V2X UE B 100-2 are present out of coverage (OoC) of the base station. Furthermore, the V2X UE A 100-1, the V2X UE B 100-2, and the V2X UE D 100-4 may receive a signal from the satellite.

The V2X UE A 100-1 and the V2X UE B 100-2 are unable to receive a sync signal from the base station because they are located out of coverage of the base station, but are able to receive the signal from the satellite. Accordingly, the V2X UE A 100-1 and the V2X UE B 100-2 may use the signal from the satellite as a sync signal for V2X communication. The signal from the satellite may be a global positing system (GPS) signal or a global navigation satellite system (GNSS) signal, for example.

However, there may be a problem if the sync signal from the base station and the signal from the satellite (e.g., GNSS) have not been subjected to time sync. For example, there is a problem in that a signal that has been subjected to time sync based on the signal from the satellite (e.g., GNSS) and that is transmitted by the V2X UE C 100-3 in FIG. 11 may cause interference with the base station that receives an uplink signal through the same frequency.

<Disclosure of this Specification>

Accordingly, the disclosure of this specification proposes schemes for solving the aforementioned problem.

I. First Disclosure

First, a scenario in which V2X UE is located in coverage (IC) and a scenario in which V2X UE is located out of coverage (OoC) may be taken into consideration as a scenario for using a satellite signal as a sync signal in V2X communication.

In existing D2D communication (i.e., sidelink), a need for transmission timing and a timing error has been determined as follows with respect to each of the scenarios.

A. In the case of in coverage (IC)

Transmission timing: transmission timing of D2D UE (or ProSe UE) is $(N_{TA,SL}+N_{TA\ offset})\cdot T_S$. In this case, the $N_{TA\ offset}$ means transmission timing adjustment or transmission timing advance offset expressed as a $T_s$ unit. The $N_{TA,SL}$ is a timing offset between a sidelink and a radio frame, that is, a criterion for timing, and is expressed as a $T_s$ unit. $N_{TA,SL}=N_{TA}$ or $N_{TA,SL}=0$. The $N_{TA}$ means a timing offset between an uplink radio frame and a downlink radio frame.

A timing error: a timing error $T_e$ is listed in the following table.

TABLE 10

| Downlink bandwidth (MHz) | $T_e$ |
|---|---|
| 1.4 | $24*T_S$ |
| ≥3 | $12*T_S$ |

In this case, $T_S$ is a basic time unit and $T_S=1/(15000\times 2048)$ seconds.

B. In the case of out of coverage (OoC)

Transmission timing: transmission timing of D2D UE (or ProSe UE) is $(N_{TA,SL}+N_{TA\ offset})\cdot T_S$. In this case, $N_{TA\ offset}=0$ or $N_{TA,SL}=0$.

A timing error: a timing error $T_e$ is listed in the following table.

TABLE 11

| Sidelink bandwidth (MHz) | $T_e$ |
|---|---|
| ≥1.4 | $24*T_S$ |

Compared to the aforementioned existing requirement, transmission timing requirement based on a signal from a satellite (e.g., GNSS) may be improved as follows.

In an actual environment, a timing offset may be present between a sync signal from a satellite and a downlink signal from a base station.

If V2X UE does not have information about a timing offset in a situation in which it has been located in coverage and if the V2X UE attempts to use a signal from a satellite with higher priority than a downlink signal from a base station for time synchronization, a signal transmitted by the V2X UE may cause interference with a signal transmitted by another V2X UE.

In order to minimize such interference, the first disclosure of this specification proposes that the base station provides the V2X UE with information about the timing offset between the signal of the satellite (e.g., GNSS) and the downlink signal of the base station. To this end, the base station may need to have the capability to receive the signal from the satellite. If the timing offset received by the V2X UE from the base station is expressed by $N_{GNSSoffset}$, for example, the transmission timing of the V2X UE may be determined to be "$(N_{TA,SL}+N_{TA\ offset}+N_{GNSSoffset})\cdot T_S$." In this case, the range of the timing offset $N_{GNSSoffset}$ may be −500 us≤$N_{GNSSoffset}$<500 us. That is, a maximum value of the timing offset $N_{GNSSoffset}$ may correspond to half (i.e., 500 us that is the length of one slot) the length (i.e., 1 ms) of a subframe. If the value of 500 us is a positive number, this means that the downlink signal from the base station is ahead of the signal from the satellite in terms of time. If the value of 500 us is a negative number, however, this means that the downlink signal from the base station is behind the signal from the satellite in terms of time.

A unit of the timing offset $N_{GNSSoffset}$ is $16*Ts$. $Ts=1/(15000*2048)s=1/(30.72)$ us.

This is described below with reference to FIG. 12.

Figure 12:
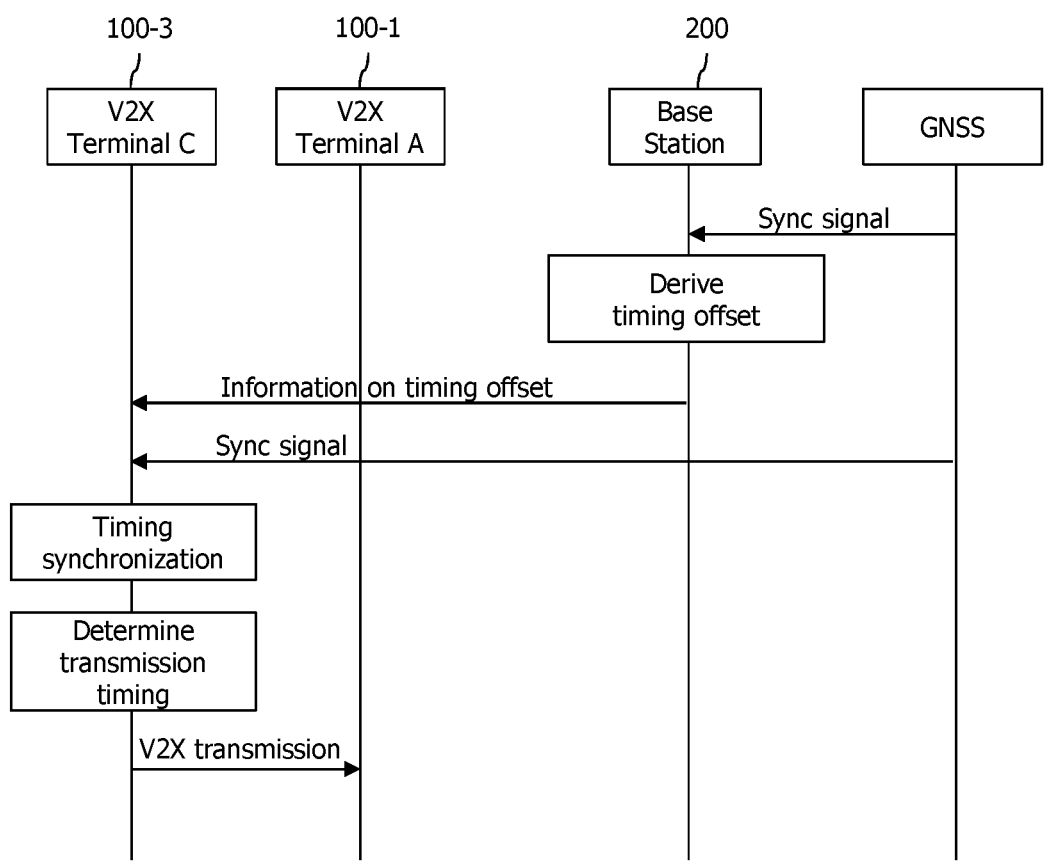
FIG. 12 is an exemplary diagram showing a first disclosure of this specification.

FIG. 12 is an exemplary diagram showing a first disclosure of this specification.

Referring to FIG. 12, the base station 200 measures and calculates a timing offset (e.g., $N_{GNSSoffset}$) between its own downlink signal and a signal from a satellite (e.g., GNSS), and provides the V2X UE C 100-3 with information about the calculated timing offset (e.g., $N_{GNSSoffset}$).

The V2X UE C 100-3 performs time sync based on the signal from the satellite (e.g., GNSS).

If the V2X UE C 100-3 performs V2X transmission, it determines transmission timing based on the timing offset.

In this case, if the information about the timing offset (e.g., $N_{GNSSoffset}$) indicates the time offset of the signal from the satellite (e.g., GNSS) based on the downlink signal from the base station, the V2X UE C 100-3 determines the transmission timing by applying the timing offset based on the timing of the downlink signal from the base station. For example, the transmission timing may be "$(N_{TA,SL}+N_{TA\ offset}+N_{GNSSoffset})\cdot T_S$." In this case, as described above, if the range of the timing offset $N_{GNSSoffset}$ is −500 us≤ $N_{GNSSoffset}$<500 us and the unit of the timing offset $N_{GNSSoffset}$ is $16*Ts$, the information about the timing offset is a 11-bit length, which may indicate a value of −960~959. For reference, −960 indicates −500 us/($16*Ts$).

In contrast, if the information about the timing offset (e.g., $N_{GNSSoffset}$) indicates the time offset of the downlink signal from the base station based on the signal from the satellite, the V2X UE C 100-3 determines the transmission timing by applying the timing offset based on the timing of the signal from the satellite. For example, if the timing offset $N_{GNSSoffset}$ is a positive number, the transmission timing may be "$(N_{TA,SL}+N_{TAoffset}+N_{GNSSoffset}-30720)\cdot T_S$." If the timing offset $N_{GNSSoffset}$ is a negative number, however, the transmission timing may be "$(N_{TA,SL}+N_{TA\ offset}+N_{GNSSoffset})\cdot T_S$."

If the range of another timing offset $N_{GNSSoffset}$ is defined as "$0 \leq N_{GNSSoffset} < 1$" (i.e., the range of the timing offset $N_{GNSSoffset}$ is defined to be greater than 0 or to be a positive number), bits required to express information about the timing offset are 11 bits, which may indicate a value between 0~1919. In this case, the V2X UE may determine the transmission timing by applying the timing offset based on the signal from the satellite. More specifically, the transmission timing may be "$(N_{TA,SL}+N_{TA\ offset}+N_{GNSSoffset}-30720)\cdot T_S$."

In contrast, if the range of the timing offset $N_{GNSSoffset}$ is defined as "$-1\ ms \leq N_{GNSSoffset} < 0$" (i.e., the range of the timing offset $N_{GNSSoffset}$ is defined to be smaller than 0 or to be a negative number), bits required to express information about the timing offset are 11 bits, which may indicate a value between −1919~0. In this case, the V2X UE may determine the transmission timing by applying the timing offset based on the signal from the satellite. More specifically, the transmission timing may be "$(N_{TA,SL}+N_{TA\ offset}+N_{GNSSoffset})\cdot T_S$."

In other words, the first disclosure of this specification proposes that the base station provides the V2X UE with the information about the timing offset as described above. The V2X UE obtains information about the timing offset when it is located in coverage of the base station, and uses the timing offset when it is located out of coverage of the base station.

A transmission error is described below. The existing requirements 24*Ts is the same as 0.78 ppm (parts per million) for 1 second, and the existing requirements 12*Ts is the same as 0.4 ppm for 1 second. Assuming that the V2X UE has a satellite signal receiver having quality of about 0.5 ppm, if the V2X UE performs time sync based on a signal form a satellite and sends a signal, it may determine a transmission error to be 24*Ts based on the values.

II. Second Disclosure

In the first disclosure, the timing offset $N_{GNSSoffset}$ between the signal from the satellite (e.g., GNSS) and the downlink signal of the base station has been described. A timing advance offset for transmission, that is, $N_{TA,offset}$, in V2X communication is described below.

In a conventional technology, the timing advance offset $N_{TA,offset}$ has been determined as below.

$N_{TA,offset}$=0 Ts with respect to a frame structure type 1 (the FDD radio frame structure shown in FIG. 2)

$N_{TA,offset}$=624 Ts with respect to a frame structure type 2 (the TDD radio frame structure shown in FIG. 3)

Furthermore, in the case of D2D communication, the timing advance offset $N_{TA,offset}$ has been determined depending on the type of reference cell. A base station sends information about whether a reference cell is a serving cell, a PCell or an SCell or whether a reference cell is a cell not a serving cell to UE. If UE is located out of coverage (OoC), the timing advance offset $N_{TA,offset}$ is determined to be 0.

In the case of V2X communication, if a base station is a criterion for time sync, the timing advance offset $N_{TA,offset}$ is determined as in the above D2D communication.

In the case of V2X communication, however, if a signal from a satellite (e.g., GNSS) is a criterion for time sync when V2X UE is located in coverage of a base station, the base station needs to notify the V2X UE of a direct frame number (DFN) offset. The DFN offset is a value that shifts DFN #0 with respect to a sync time derived from the signal from the satellite (e.g., GNSS). That is, DFN timing=criterion timing derived from the signal of the GNSS+a DFN offset. The V2X UE performs transmission for V2X communication based on the DFN.

In contrast, if the criterion for time sync is the downlink signal of the base station in coverage, the V2X UE applies the timing advance offset $N_{TA,offset}$ for transmission in V2X communication based on the type of reference cell received from the base station.

Thereafter, if the V2X UE moves out of coverage of the base station and thus the criterion for time sync has changed from the base station to the satellite (e.g., GNSS), a DFN boundary for the V2X communication needs to be shifted by a DFN offset. In this case, if the V2X UE is already aware of information about a reference cell and information about the reference cell is still valid, the V2X UE may maintain the timing advance offset $N_{TA,offset}$.

If information about the reference cell is not valid in a situation in which the V2X UE has been located in the area where the signal of the satellite (e.g., GNSS) is a criterion for time sync or the V2X UE has not received information about the reference cell, however, the V2X UE performs transmission for V2X communication by applying the timing advance offset $N_{TA,offset}$ based on a serving cell or PCell, which causes a problem.

A more detailed example is described with reference to FIGS. 13a and 13b.

Figure 13A:
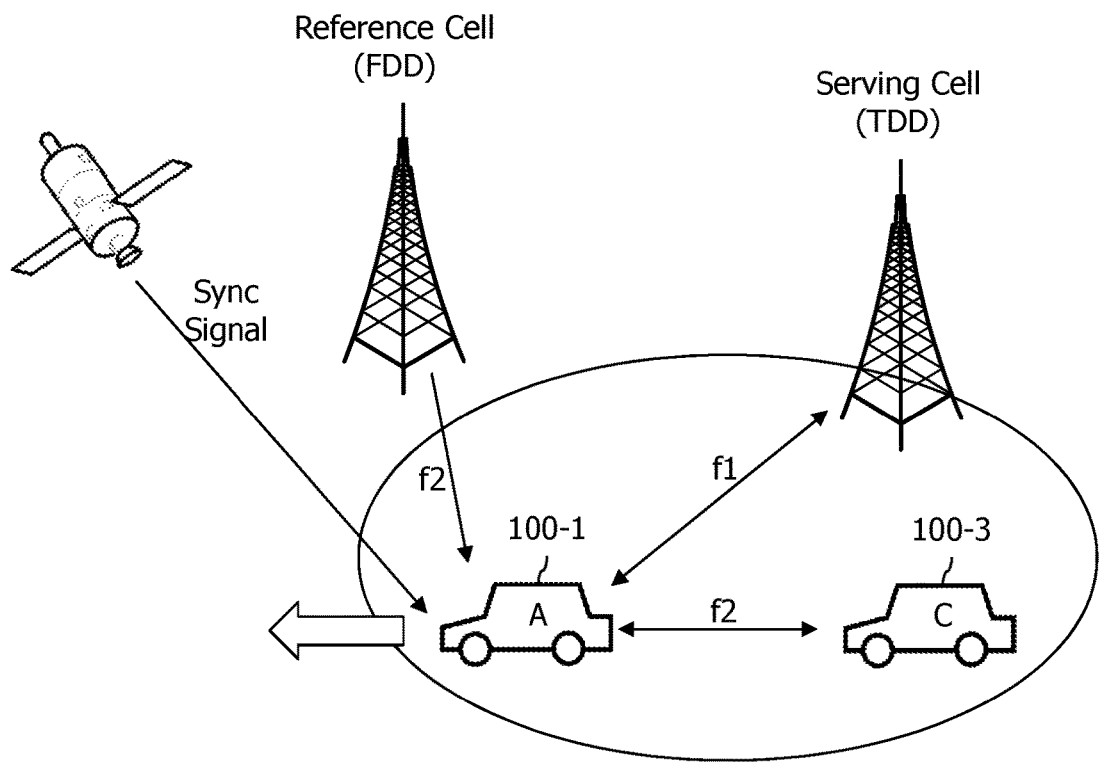
FIGS. 13a and 13b are exemplary diagrams showing an example for illustrating a second disclosure of this specification.
Figure 13B:
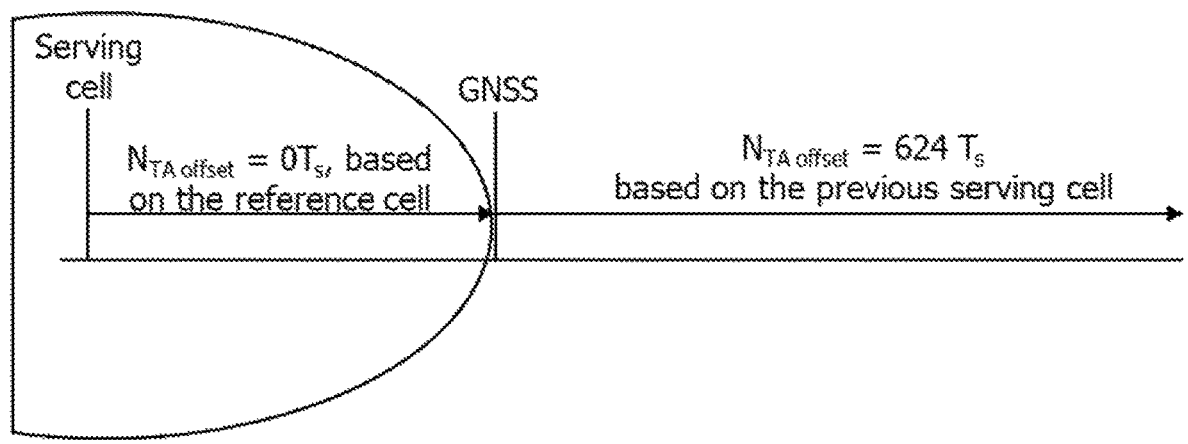

FIGS. 13a and 13b are exemplary diagrams showing an example for illustrating the second disclosure of this specification.

Referring to FIG. 13a, the serving cell of V2X UE A 100-1 is a TDD-based cell. Furthermore, a reference cell is an FDD-based cell in coverage of the serving cell.

Thereafter, in the case where the V2X UE A 100-1 moves out of coverage of the base station of the serving cell and thus a signal from a satellite (e.g., GNSS) becomes a criterion for time sync, if a reference cell has not been defined or a reference cell is invalid, as shown in FIG. 13b, the timing advance offset $N_{TA,offset}$ changes from $0T_s$ to $624T_s$. In this case, the V2X transmission signal of the V2X UE A 100-1 may cause interference with reference cell uplink. Accordingly, there may be a problem in that the base station of the reference cell schedules radio resources. In order to solve such a problem, the base station needs to provide information about a reference cell by taking into consideration a situation in which the V2X UE has been located in the area where the satellite signal becomes a criterion for time sync.

Another example is described below with reference to FIGS. 14a and 14b.

Figure 14A:
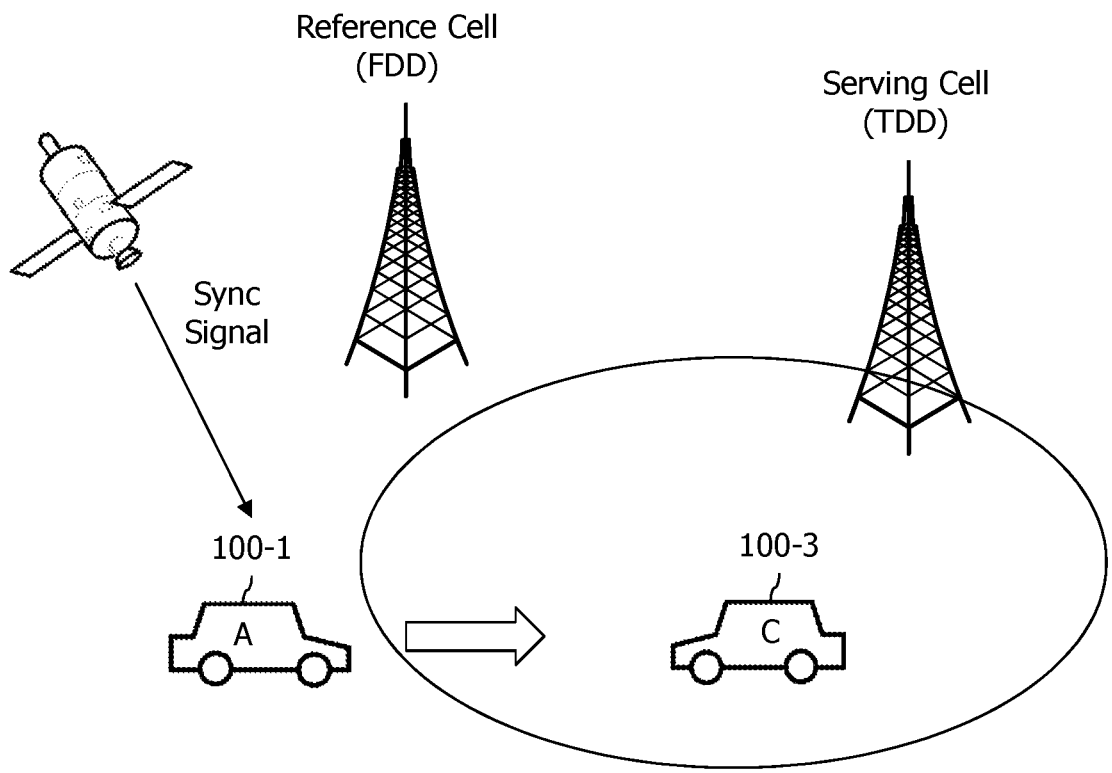
FIGS. 14a and 14b are exemplary diagrams showing another example for illustrating the second disclosure of this specification.
Figure 14B:
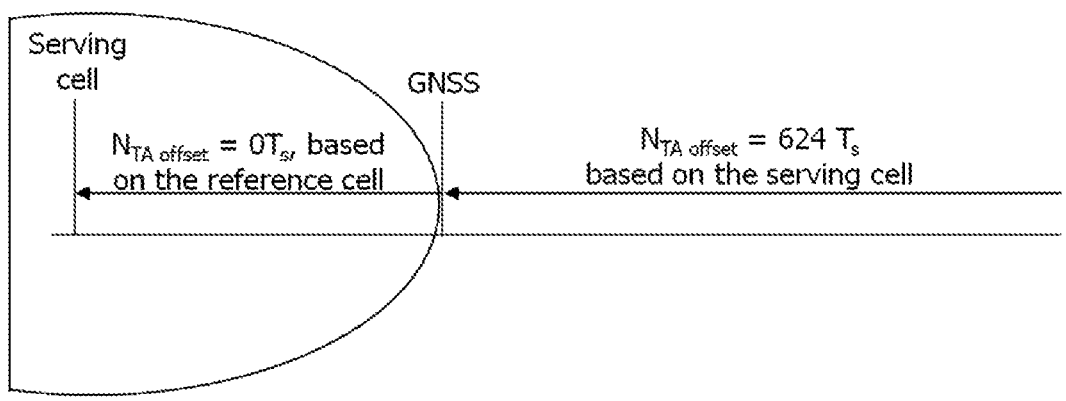

FIGS. 14a and 14b are exemplary diagrams showing another example for illustrating the second disclosure of this specification.

As shown in FIG. 14a, if a criterion for time sync is a signal from a satellite (e.g., GNSS) and V2X UE has not received information about a reference cell from a base station, the V2X UE performs V2X transmission by applying a timing advance offset $N_{TA,offset}$ based on a serving cell or a PCell.

Thereafter, when the criterion for time sync changes from the signal of the satellite (e.g., GNSS) to the base station, the timing advance offset $N_{TA,offset}$ will also change.

For example, in a situation in which the reference cell has not been defined with respect to the satellite (e.g., GNSS), if the V2X UE moves into coverage of the base station, the timing advance offset $N_{TA,offset}$ changes from $624 T_s$ to $0 T_s$ as shown in FIG. 14b. In this case, a V2X transmission signal from the V2X UE A 100-1 may cause interference. Accordingly, there may be a problem in that a serving cell base station schedules radio resources. In order to solve such a problem, the base station has to provide information about a reference cell by taking into consideration a situation in which the V2X UE has been located in the area where the signal of the satellite (e.g., GNSS) becomes a criterion for time sync.

Figure 15:
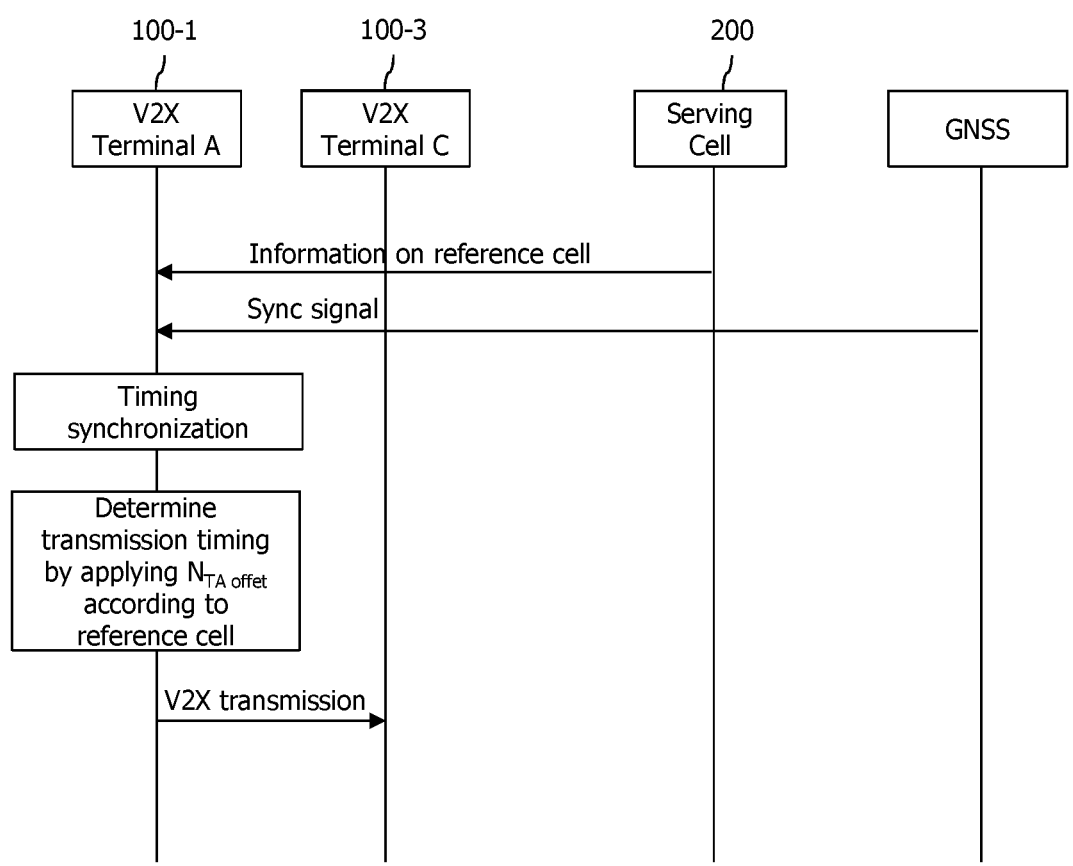
FIG. 15 is an exemplary diagram showing the second disclosure of this specification.

FIG. 15 is an exemplary diagram showing the second disclosure of this specification.

As shown in FIG. 15, although a satellite (e.g., GNSS) is a criterion for time sync in coverage (IC), the second disclosure proposes that a base station determines a reference cell and notifies V2X UE of the reference cell.

Furthermore, if the satellite (e.g., GNSS) is a criterion for time sync out of coverage, the second disclosure proposes that the base station determines a reference cell and notifies the V2X UE of the reference cell, and the V2X UE applies "$N_{TA,offet}=0T_s$."

Furthermore, if a signal from adjacent UE (e.g., called SyncRef UE) out of coverage is a criterion for time sync, the second disclosure proposes that V2X UE applies "$N_{TA,offet}=T_s$."

The aforementioned proposals are summarized as follows.

A proposal 1: if the downlink signal of a base station is a criterion for time sync, information about a reference cell is transferred to V2X UE so that the V2X UE may determine a timing advance offset $N_{TA,offset}$ to be applied for V2X transmission timing.

A proposal 2: if a signal from a satellite (e.g., GNSS) is a criterion for time sync in coverage (IC), information about a reference cell is transferred to V2X UE so that the V2X UE may determine a timing advance offset $N_{TA,offset}$ to be applied for V2X transmission timing.

A proposal 3: if a signal from a satellite (e.g., GNSS) is a criterion for time sync out of coverage (OoC), a timing advance offset $N_{TA,offset}$ to be applied by V2X UE for V2X transmission timing may be 0 Ts.

A proposal 4: if a signal from adjacent UE (or called SyncRef UE) is a criterion for time sync out of coverage (OoC), a timing advance offset $N_{TA,offset}$ to be applied by V2X UE for V2X transmission timing may be 0 Ts.

As in the aforementioned proposals, although a criterion for time sync is a signal from a satellite (e.g., GNSS), a base station has to provide information about a reference cell to V2X UE. In particular, when a situation in which V2X UE moves and thus a serving cell and a reference cell are changed is taken into consideration, if a criterion for time sync is a signal from a satellite (e.g., GNSS), it may be effective that a base station provides information about the reference cell to the V2X UE.

The first disclosure and second disclosure of this specification described so far may be combined. For example, such a combination is described with reference to FIG. 16.

Figure 16:
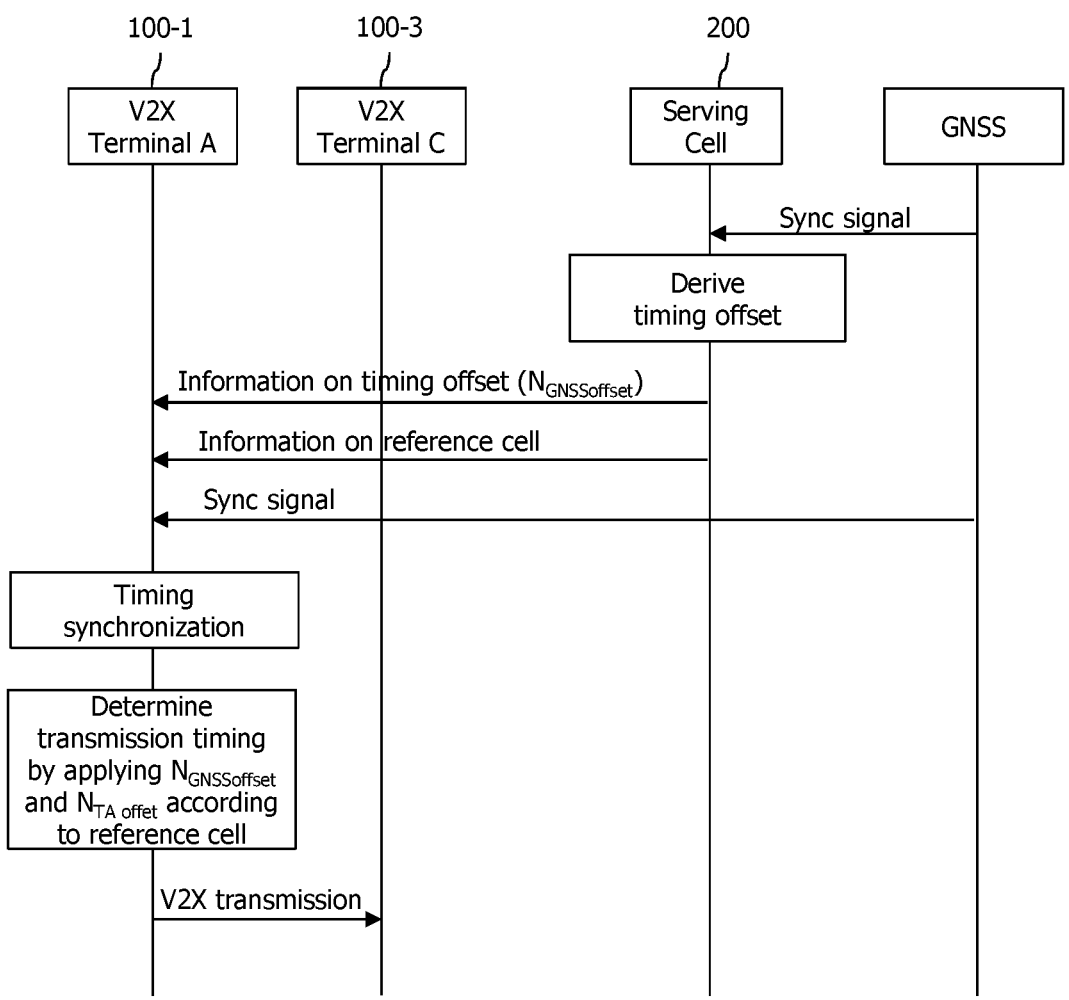
FIG. 16 is an exemplary diagram showing a combination of the first disclosure and second disclosure of this specification.

FIG. 16 is an exemplary diagram showing a combination of the first disclosure and second disclosure of this specification.

Referring to FIG. 16, a base station measures and calculates a timing offset (e.g., $N_{GNSSoffset}$) between its own downlink signal and a signal from a satellite and provides information about the calculated timing offset (e.g., $N_{GHSSoffset}$) to V2X UE.

Furthermore, although a criterion for time sync is the signal from the satellite (e.g., GNSS), the base station provides information about a reference cell to the V2X UE.

Accordingly, the V2X UE may determine V2X transmission timing using the timing offset (e.g., $N_{GNSSoffset}$) and a timing advance offset $N_{TA,offset}$ according to the reference cell.

The aforementioned embodiments of the present invention may be implemented through various means. For example, the embodiment of the present invention may be implemented by hardware, firmware, software or a combination of them. This is described in detail with reference to FIG. 17.

Figure 17:
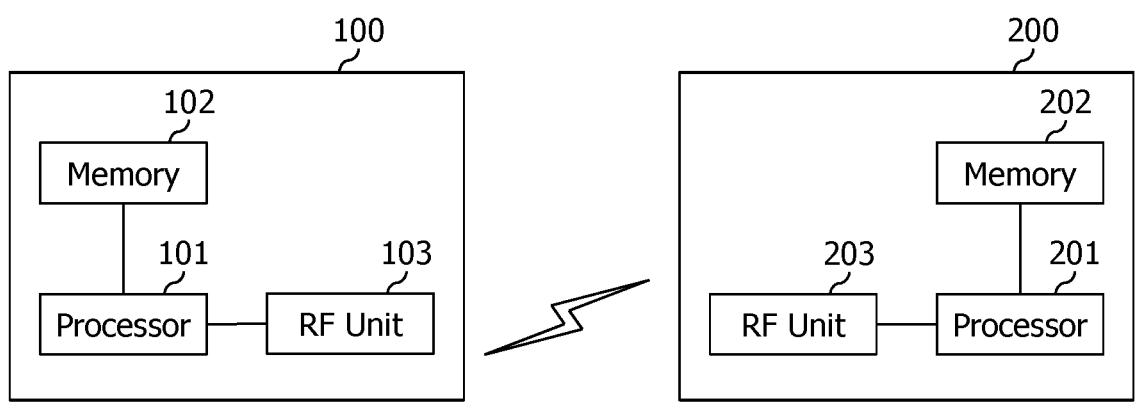
FIG. 17 is a block diagram showing a wireless communication system in which the disclosure of this specification is implemented.

FIG. 17 is a block diagram showing a wireless communication system in which the disclosure of this specification is implemented.

The base station 200 includes a processor 201, memory 202, and a radio frequency (RF) unit 203. The memory 202 is connected to the processor 201 and stores a variety of pieces of information for driving the processor 201. The RF unit 203 is connected to the processor 201 and sends and/or receives a radio signal. The processor 201 implements the proposed functions, processes and/or methods. In the aforementioned embodiments, the operation of the base station may be implemented by the processor 201.

The UE 100 includes a processor 101, memory 102, and an RF unit 103. The memory 102 is connected to the processor 101 and stores a variety of pieces of information for driving the processor 101. The RF unit 103 is connected to the processor 101 and sends and/or receives a radio signal. The processor 101 implements the proposed functions, processes and/or methods.

According to the disclosure of the present invention, the problem of the conventional technology described above may be solved.

The processor may include application-specific integrated circuits (ASICs), other chipsets, logic circuits and/or data processors. The memory may include read-only memory (ROM), random access memory (RAM), flash memory, memory cards, storage media and/or other storage devices. The RF unit may include a baseband circuit for processing a radio signal. When the aforementioned embodiment is implemented in software, the aforementioned scheme may be implemented into a module (process or function) that performs the above function. The module may be stored in the memory and executed by the processor. The memory may be placed inside or outside the processor and may be connected to the processor using a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the range of right of the present invention.

What is claimed is:

1. A method for determining transmission timing, the method being performed by a vehicle to everything (V2X) terminal and comprising:
   receiving information related to a direct frame number (DFN) offset;
   determining DFN timing based on the information related to the DFN offset, wherein a global navigation satellite system (GNSS) is a synchronization reference for the determination of the DFN timing;
   determining transmission timing based on the DFN timing, a timing offset for a sidelink communication with a neighboring terminal, and a timing advance offset,
   wherein the transmission timing is determined based on applying a value, which is based on sum of the timing offset for the sidelink communication and the timing advance offset, to a boundary of subframe, which is based on the DFN timing; and
   transmitting signal for the sidelink communication based on the transmission timing.

2. The method of claim 1, wherein the timing advance offset is equal to 0, based on that the V2X terminal is out of coverage of a base station and based on that the synchronization reference is the GNSS.

3. The method of claim 1, wherein the time synchronization is performed based on the signal of the GNSS, based on that the V2X terminal is located in coverage of a base station or out of coverage of the base station.

4. The method of claim 1, wherein the transmission timing is determined based on the DFN timing, and $(N_{TA,SL}+N_{TA\ offset}+N_{GNSSoffset})\cdot T_S$,
   wherein the $N_{TA,SL}$ is related to a timing offset for a sidelink communication, the $N_{GNSSoffset}$ is related to a timing offset for the GNSS, the $N_{TA\ offset}$ is related to the timing advance offset, and the Ts is a basic time unit.

5. The method of claim 1, wherein the DFN timing is determined based on applying the DFN offset to a timing obtained from the signal of the GNSS.

6. A vehicle to everything (V2X) terminal for determining transmission timing, the terminal comprising:
- a transceiver; and
- a processor operatively connected to the transceiver and configured to:
- control the transceiver to receive information related to a direct frame number (DFN) offset;
- determine DFN timing based on the information related to the DFN offset, wherein a global navigation satellite system (GNSS) is a synchronization reference for the determination of the DFN timing;
- determine transmission timing based on the DFN timing, a timing offset for a sidelink communication with a neighboring terminal, and a timing advance offset,
- wherein the transmission timing is determined based on applying a value, which is based on sum of the timing offset for the sidelink communication and the timing advance offset, to a boundary of subframe, which is based on the DFN timing; and
- transmit signal for the sidelink communication based on the transmission timing.

7. The V2X terminal of claim 6,
wherein the timing advance offset is equal to 0, based on that the V2X terminal is out of coverage of a base station and based on that the synchronization reference is the GNSS.

8. The V2X terminal of claim 6, wherein the time synchronization is performed based on the signal of the GNSS, based on that the V2X terminal is located in coverage of a base station or out of coverage of the base station.

9. The V2X terminal of claim 6, wherein the transmission timing is determined by $(N_{TA,SL}+N_{TA\ offset}+N_{GNSSoffset})\cdot T_S$,
wherein the $N_{TA,SL}$ indicates the timing offset applied for the sidelink communication, the $N_{GNSSoffset}$ indicates the first timing offset, the $N_{TA\ offset}$ corresponds to the second timing offset and indicates a timing advance offset and the Ts indicates a basic time unit.

10. The V2X terminal of claim 6, wherein the DFN timing is determined based on applying the DFN offset to a timing obtained from the signal of the GNSS.

* * * * *